Dec. 7, 1943.   C. S. SZEGHO   2,336,134
COLOR TELEVISION SYSTEM
Filed May 13, 1942
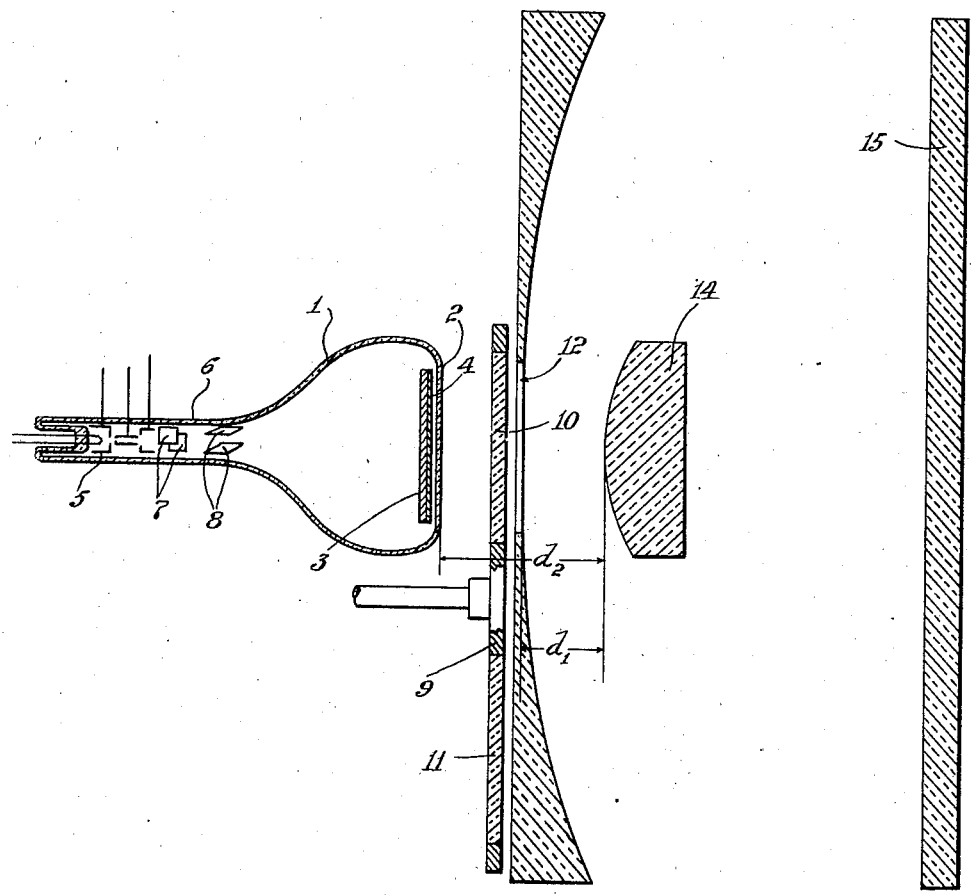
INVENTOR
Constantin S. Szegho
BY Paul Kolisch
ATTORNEY Patented Dec. 7, 1943

2,336,134

UNITED STATES PATENT OFFICE 2,336,134

COLOR TELEVISION SYSTEM

Constantin S. Szegho, New York, N. Y., assignor to The Rauland Corporation, Chicago, Ill., a corporation of Illinois Application May 13, 1942, Serial No. 442,836

2 Claims. (Cl. 178—5.4)

This invention relates to new and useful improvements in television systems and more particularly to color television systems.

It is the object of the invention to increase the light output in color television receivers to such an extent as to make possible the projection of the picture on a relatively large sized screen.

With this object in view I provide in combination with the customary receiving tube a high aperture mirror optic of the flat field Schmidt camera type. (James G. Baker: The Solid Glass Schmidt Camera and a Family of Flat-Field Cameras, equivalent in performance to the Schmidt camera. Proceedings of American Philosophical Society, vol. 82, No. 3, April 30, 1940.)

The drawing diagrammatically illustrates an embodiment of the invention.

A cathode ray tube of the front surface projection type is employed. It consists of an evacuated envelope 1 having a transparent window 2 back of which a flat, extremely thin sheet of aluminum 3 is provided as a support for a layer of fluorescent material 4. The fluorescent material is excited by electrons piercing the support 3 and penetrating into the layer, the electrons being emitted from an electron gun 5 in the neck 6 of the envelope 1. The beam of electrons may be deflected by the customary deflecting means such as pairs of plates 7 and 8.

A disc 9 is rotated in front of the window 2 in synchronism with a corresponding disc at the transmitting station. The disc 9 is provided with two or more color filters 10 and 11 which are successively brought into alignment with the window 2 and an aperture 12 in a concave or substantially spherical mirror 13. The filters and aperture are of substantially the same diameter as the layer 4.

The mirror is thinner near its center than its edges so as to reduce the distance between the mirror and tube to a minimum. A convex auxiliary mirror 14 is in alignment with the aperture 12 of the mirror and reflects the image of the fluorescent layer 4 as modified by the color filter in disc 9 on to the mirror 13. The mirror 13 then reflects the light through a correcting plate 15 on to the viewing screen. The correcting plate should preferably be made of flint and crown glass so as to correct for chromatic error and is not flat as shown.

Since the filter disc 9 is located behind the concave mirror 13 it will not impede the light projection through the correcting plate 15. The distance $d_2$ must be greater than $d_1$ at least by the small amount necessary for the location of the disc 9 between 2 and 13.

Obviously, cathode ray tubes of other suitable construction may be used and the construction and location of the various elements of the optical system must be in accordance with the practice well-known in this art.

What I claim is:

1. In combination, a cathode ray tube having an evacuated envelope, a transparent window in said envelope, a support of conducting material, a flat layer of fluorescent material on said support, an electron gun emitting a stream of electrons on to said support, a concave mirror having a central aperture of substantially the same diameter as said layer, a disc rotatably provided between the mirror and the window and having a plurality of color filters of substantially the same diameter as the aperture in said mirror, a correcting plate facing said mirror, and convex auxiliary mirror between said plate and the concave mirror and aligned with the aperture in the latter.

2. In combination, a cathode ray tube having an evacuated envelope, a transparent window in said envelope, a flat support of conducting material adjacent said window, a flat layer of fluorescent material on said support facing said window, an electron gun emitting a stream of electrons on to said support, a concave mirror having a central aperture of substantially the same diameter as said layer, the mirror being of a thickness gradually increasing from the center towards its edge, a disc rotatably provided between the mirror and the window and having a plurality of color filters of substantially the same diameter as the aperture in said mirror, a correcting plate facing said mirror, and a convex auxiliary mirror between said plate and concave mirror and aligned with the aperture in the latter.

CONSTANTIN S. SZEGHO.